(12) United States Patent
Anvar et al.

(10) Patent No.: US 12,240,677 B2
(45) Date of Patent: Mar. 4, 2025

(54) NANOEMULSION COMPOSITION OF LAVENDER OIL FOR FOOD PACKAGING

(71) Applicants: Seyed AmirAli Anvar, Tehran (IR); Sara Allahyaribeik, Tehran (IR); Maryam Ataee, Tehran (IR); Leila Golestan, Tehran (IR); Hamed Ahari, Tehran (IR); Mahdi Rahimian, Tehran (IR); Sima Moradi, Tehran (IR)

(72) Inventors: Seyed AmirAli Anvar, Tehran (IR); Sara Allahyaribeik, Tehran (IR); Maryam Ataee, Tehran (IR); Leila Golestan, Tehran (IR); Hamed Ahari, Tehran (IR); Mahdi Rahimian, Tehran (IR); Sima Moradi, Tehran (IR)

( * ) Notice: Subject to any disclaimer, the term of this patent is extended or adjusted under 35 U.S.C. 154(b) by 222 days.

(21) Appl. No.: 18/097,959

(22) Filed: Jan. 17, 2023

(65) Prior Publication Data
US 2024/0109712 A1    Apr. 4, 2024

Related U.S. Application Data

(60) Provisional application No. 63/411,165, filed on Sep. 29, 2022.

(51) Int. Cl.
*B65D 81/28* (2006.01)
*A01N 25/04* (2006.01)
*A01N 65/08* (2009.01)
*A01N 65/22* (2009.01)

(52) U.S. Cl.
CPC .............. *B65D 81/28* (2013.01); *A01N 25/04* (2013.01); *A01N 65/08* (2013.01); *A01N 65/22* (2013.01)

(58) Field of Classification Search
None
See application file for complete search history.

(56) References Cited

U.S. PATENT DOCUMENTS

2013/0295260 A1*  11/2013  Schrader ................ A23L 27/88
                                                         426/549

\* cited by examiner

*Primary Examiner* — Michael V Meller
(74) *Attorney, Agent, or Firm* — Barry Choobin; Patent 360

(57) ABSTRACT

A nanoemulsion composition for use in food packaging to enhance antimicrobial properties, barrier properties, and stability thereof, the nanoemulsion composition includes lavender essential oil as an oil phase and Viper's-buglosses aqueous extract as an aqueous phase. The composition is prepared using a suitable concentration of emulsifying agent with homogenization and sonification techniques.

4 Claims, 11 Drawing Sheets

NANOEMULSION COMPOSITION OF LAVENDER OIL FOR FOOD PACKAGING

CROSS-REFERENCE TO RELATED APPLICATIONS

This application claims priority from a U.S. Provisional Patent Appl. No. 63/411,165 filed on 29 Sep. 2022, which is incorporated herein by reference in its entirety.

FIELD OF INVENTION

The present invention relates to a nanoemulsion composition, and more particularly, the present invention relates to a nanoemulsion of lavender essential oil and Viper's-buglosses extract.

BACKGROUND

The use of nanotechnology in the food industry has received much attention. The adoption of nanotechnology in food packaging has led to several improvements resulting primarily in longer shelf life and preservation. Nanoemulsions are one of the main tools in nanotechnology being adopted in food sciences for higher efficacies. Recently, consumers and modern food industries are focusing on nanoengineered essential oils. The nanoemulsion consists of two immiscible liquids and an emulsifier. Proper mixing of these components regulates the properties and stability of the emulsion.

Essential oils are secondary metabolites of aromatic plants and are considered "generally safe" (GRAS) by the US FDA. Nanoencapsulation of essential oils in carrier matrices is a new green strategy to overcome the disadvantages and improve the performance of essential oils in the food industry. Essential oils are well-known candidates for producing nanoemulsions for various applications, including food packaging systems. The efficacy of essential oils in food packaging is affected by several factors including the rheological, optical, release, and stability properties. Amongst them, stability is critical because the most prolonged stability approves the efficiency of the preparation technique and also the quality of the nanoemulsion. The undesirable molecular interactions at the oil-water interface due to the hydrophobic effect induce thermodynamic instability in nanoemulsions. The nanoemulsions degrade due to flocculation, gravitational separation, coalescence, phase separation, and Ostwald ripening.

A need is therefore appreciated for a novel nano formulation of essential oils for use in food packaging that is more efficient and stable.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a highly stable nanoemulsion of lavender.

It is another object of the present invention that the nanoemulsion can be used in food packaging for longer shelf life.

It is still another object of the present invention that the nanoemulsion can prevent the growth of microorganisms.

It is a further object of the present invention that the nanoemulsion can promote the barrier properties of packaging film that delay food spoilage, the barrier properties refer to the ability to resist the absorption of light, moisture, and oxygen.

It is yet another object of the present invention that the process can be easily scaled up.

In one aspect, disclosed is an oil-in-water nanoemulsion having Lavender essential oil as an oil phase and Viper's-buglosses extract as an aqueous phase. The disclosed nanoemulsion is a very stable emulsion of lavender oil that can remain stable for at least three months. The droplet size of disclosed nanoemulsion can range from 50-150 nm.

In one aspect, both the aqueous phase and the oil phase are functional and include active ingredients which in combination have a synergistic effect.

In one aspect, disclosed is a method of preparing the nanoemulsion by dropwise addition of the Lavender essential oil to the Viper's-buglosses aqueous extract using a homogenizer as a high shearing mixer. Suitable surfactant, such as tween-80 can be added under vigorous homogenization. The mixture can be sonicated using an ultrasonication bath at room temperature under optimized operational parameters to obtain the disclosed nanoemulsion.

The advantages and features of this invention will be more clearly understood concerning the following more detailed description and claims taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
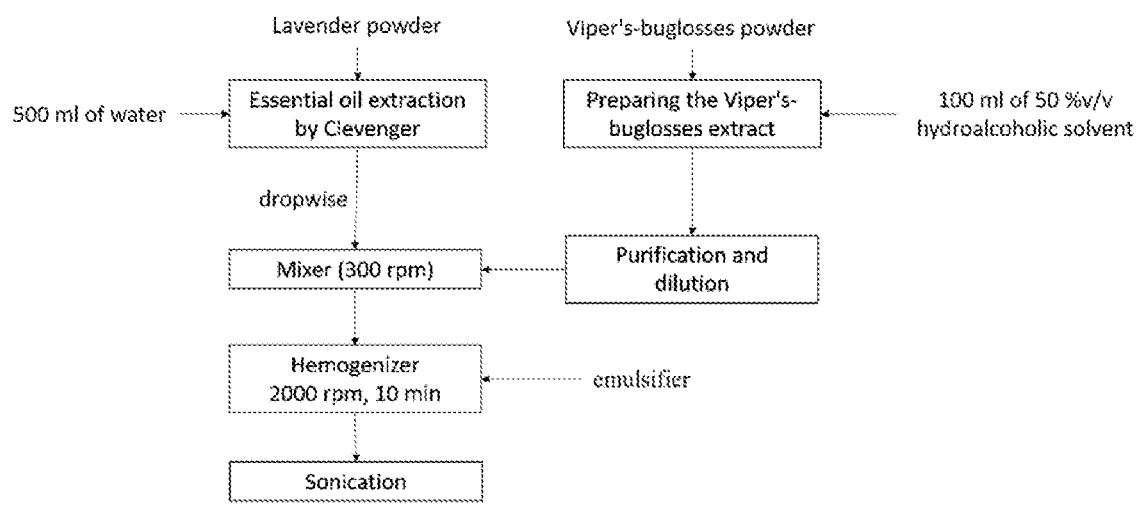
FIG. 1 is a flowchart illustrating a method of preparing the nanaemulsion from lavender oil, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation.

Disclosed is a nanoemulsion formulation of lavender essential oil and an aqueous extract of Viper's-buglosses. The disclosed nano formulation is highly stable and can be used in food packaging. The disclosed nano formulation can include optimum amounts of lavender essential oil and aqueous extract of Viper's-buglosses that are formulated with suitable emulsifying agents in an optimized ratio. Suitable emulsifying agents include tween-80, tween 20, tween 60, span, 20, span 40, span 60, lecithin, mono- and diglycerides, polysorbates, carrageenan, glycerol and the like emulsifiers known to a skilled person for use as emulsifying agents.

Disclosed is a method of preparing the nanoemulsion of lavender essential oil and aqueous extract of Viper's-buglosses. The lavender essential oil can be obtained from Clevenger, the process is known in the art. Referring to FIG. 1 which shows an exemplary embodiment of the Example 1: Preparation of the Nanoemulsion Step 1: Preparation of Lavender Essential Oil.

Figure 2:
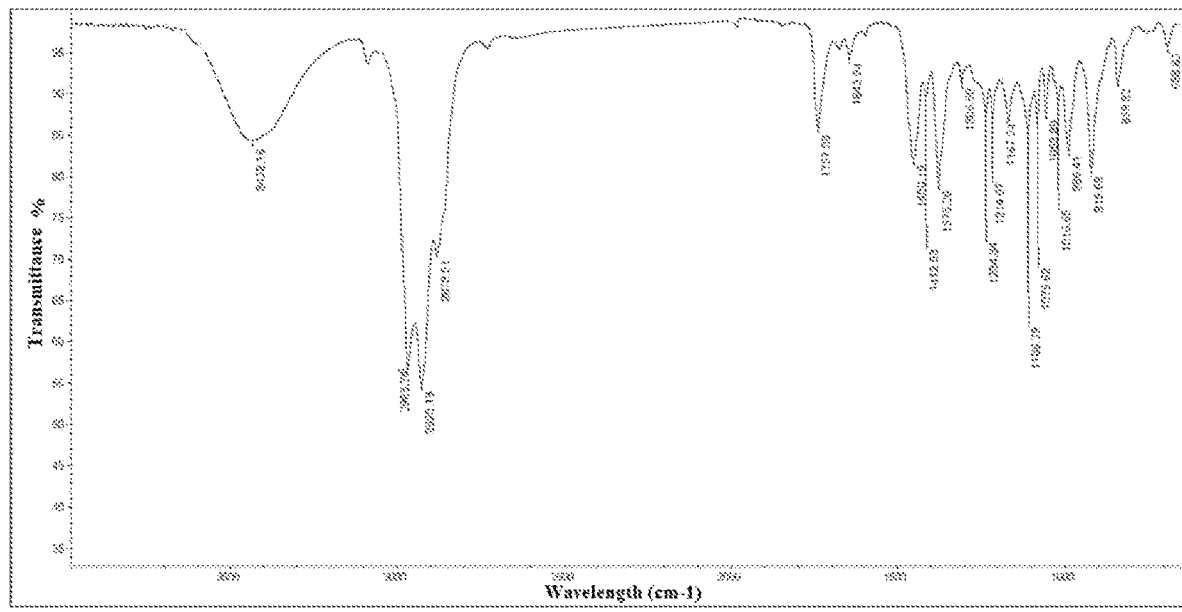
FIG. 2 shows an FTIR analysis of the lavender oil.

The Lavender essential oil was obtained using Clevenger in three runs and about 3 ml of lavender essential oil was collected. About 15 g of Lavender was grounded and transferred to a 1000 ml balloon containing 500 ml of water. Essential oil extraction process continued for 2 hours. This step was repeated three times and about 3 ml of lavender essential oil was obtained. The essential oil can be stored at 4° C. It may be preferable to use fresh Lavender for maximum efficacy of essential oil extraction. The final extracted essential oil was analyzed using FTIR, the FTIR is shown in FIG. 2. It is possible to use less or more than 15 g of Lavender. This step only affects the amount of the final extracted Lavender essential oil.

Step 2: Preparation of Viper's-Buglosses Extract

To prepare Viper's-buglosses extract, 15 g of the Viper's-buglosses was milled mechanically and was added to 100 ml of 50% v/v hydroalcoholic solvent under constant stirring at about 200 rpm. The temperature was adjusted to around 40° C. The process was prolonged for 24 h. Finally, the extract was separated using a vacuum pump, Büchner funnel, and Whatman No. 42 filter paper. The residual alcohol in the final extract was removed using Rotary Evaporators. This step only affects the concentration of the final extracted Viper's-buglosses. The final extract was diluted by adding 50 ml distilled water (equal to the evaporated alcohol) to the purified Viper's-buglosses extract. By adding distilled water, the volume of the final solution was adjusted to 100 ml. The final diluted Viper's-buglosses extract was stored at 4° C.

Step 3: Preparation of Microemulsion.

"m" ml of the Lavender essential oil was prepared and was added dropwise into 10 ml of the Viper's-buglosses extract and stirred for 1 hour at 300 rpm. The obtained mixture was then homogenized by a homogenizer at 2000 rpm for 10 min to produce microemulsion. The entire content of the system was 10 ml. Based on Table 1, "m" was defined between 0.1-1 ml. It is understood that the range 0.1-1 ml may be preferred, however, more or lesser amounts of the Lavender essential oil (m) are within the scope of the present invention. The above process can be easily scaled up to produce industrial amounts of the disclosed Lavender essential oil nanoemulsion.

TABLE 1

| code | LEO (μL) | Water (mL) | Surfactant type | Surfactant (μL) |
|------|----------|------------|-----------------|-----------------|
| A | 500 | 10 | T80 | 200 |
| B | 400 | 10 | T80 | 200 |
| C | 300 | 10 | T80 | 200 |
| D | 200 | 10 | T80 | 200 |

TABLE 1-continued

| code | LEO (µL) | Water (mL) | Surfactant type | Surfactant (µL) |
|---|---|---|---|---|
| E | 100 | 10 | T80 | 200 |
| F | 1000 | 10 | T80 | 200 |

Step 4: Preparation of Nanoemulsion

To the microemulsion, can be added dropwise 0.2 ml of emulsifier while being homogenized at 2000 rpm. The homogenization process was continued for half an hour. Tween-80 was employed as the emulsifier. The resulting mixture was sonicated using an ultrasonic bath under fixed operation conditions (Power: 170 W, off-set: 2 s, on-set: 8 s, Temperature: 25° C., Time: 40 min). The prepared nanoemulsion was placed in a cold-water bath (for about 20 minutes). Finally, the nanoemulsion was stored in the refrigerator at 4° C.

In one implementation, the sonication can be performed for about 40 minutes. This time, the ratio of oil phase and aqueous phase, and the like parameters can be optimized for longer stability of the nanoemulsion.

Example 2: Evaluation of Nanoemulsion

Figure 4:
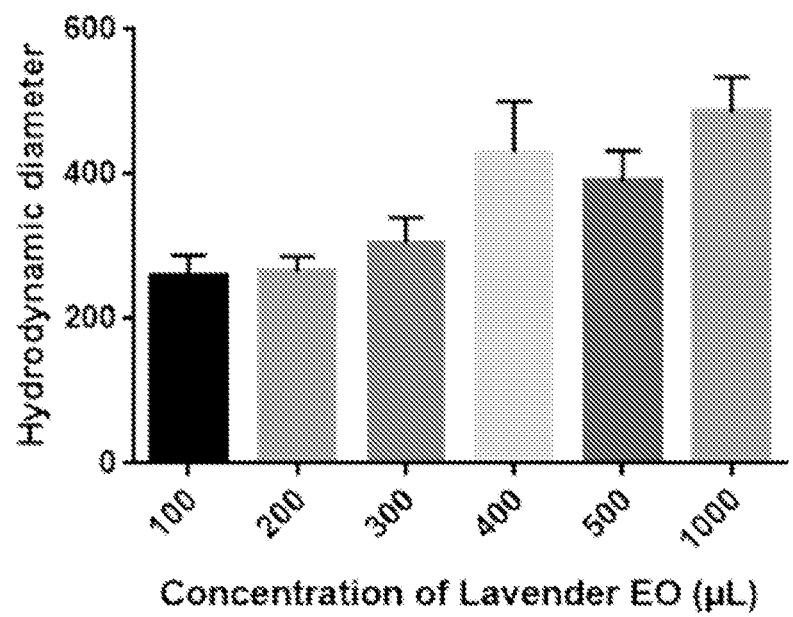
FIG. 4 depicts the hydrodynamic diameter of the droplets in different ratios of lavender essential oil/Viper's-buglosses extract.
Figure 5:
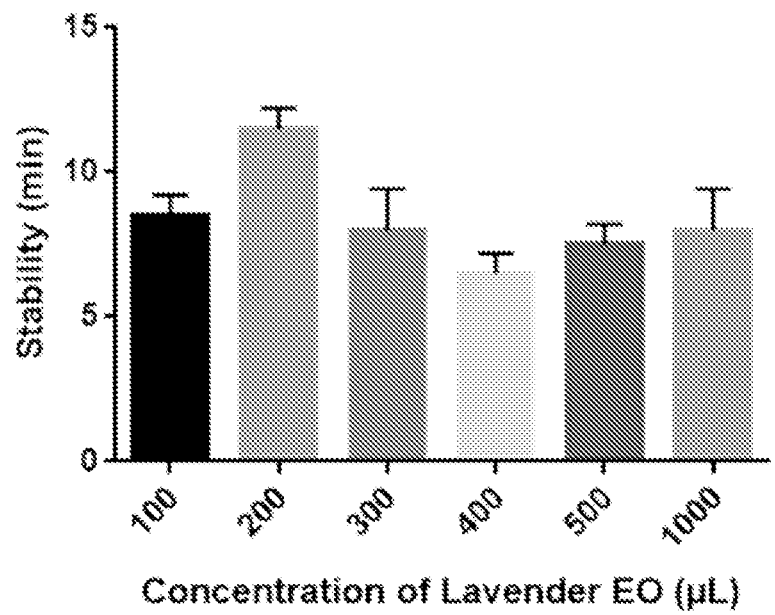
FIG. 5 demonstrates the stability (minutes) diameter in different ratios of lavender essential oil/Viper's-buglosses extract.

In one implementation, the stability of the nanoemulsion can be evaluated using the centrifugation technique. Phase separation determines the stability of the nanoemulsion. Delayed phase separation indicates that the nanoemulsion is highly stable. The centrifuge-based assay was carried out every one minute at 4000 rpm. After each run, the phase separation was studied. Images (FIG. 3) from the samples were taken for better analysis of Hydrodynamic diameter (FIG. 4) by Image J software and stability (FIG. 5).

Example 3: Optimization of the Amount of the Emulsifying Agent

The optimized sample was elected to study the effect of the surfactant (tween-80) concentration ranging between 0.1-0.5 ml on the stability of the final lavender nanoemulsion. The lavender essential oil: water ratio was set equal to 0.2:10. 10 ml of water was considered for each run. It is possible to scale up to produce a large amount of the lavender essential oil nanoemulsion. 0.2 ml of Lavender essential oil was added dropwise into 10 ml of distilled water and stirred for 1 hour at 300 rpm. The obtained solution was homogenized by a homogenizer at 2000 rpm for 10 min to produce microemulsion. In this step, the surfactant content was used in different amounts (0.1-0.5 ml) for each run, according to Table 2. Then, a known amount of emulsifier was added dropwise into the solution while homogenized at 2000 rpm. The homogenization process continued for half an hour.

TABLE 2

| LEO (µL) | Water (mL) | Surfactant type | Surfactant (µL) |
|---|---|---|---|
| 200 | 10 | T80 | 200 |
| 200 | 10 | T80 | 200 |
| 200 | 10 | T80 | 200 |
| 200 | 10 | T80 | 100 |
| 200 | 10 | T80 | 500 |
| 200 | 10 | T80 | 300 |

TABLE 2-continued

| LEO (µL) | Water (mL) | Surfactant type | Surfactant (µL) |
|---|---|---|---|
| 200 | 10 | T80 | 350 |
| 200 | 10 | T80 | 400 |
| 200 | 10 | T80 | 450 |

Figure 6:
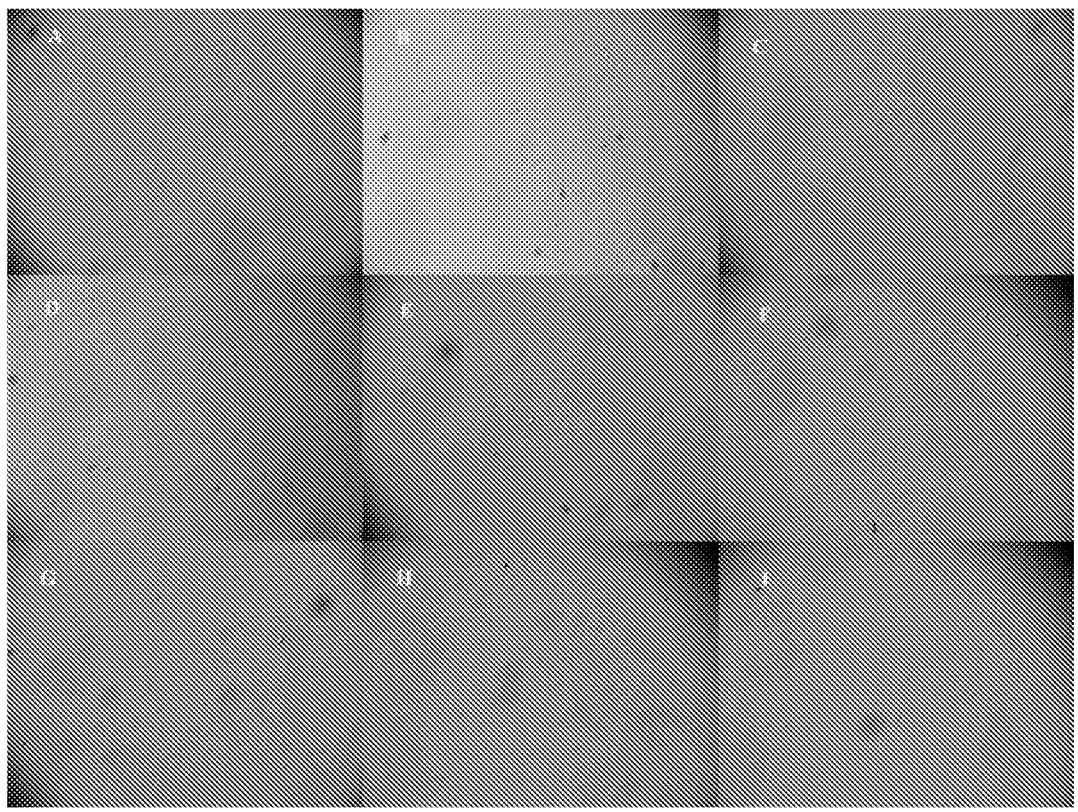
FIG. 6 shows the microscopic images of the produced nanoemulsion in different amounts of the tween-80 as surfactant considering the optimized group based on FIG. 3 and FIG. 4.
Figure 7:
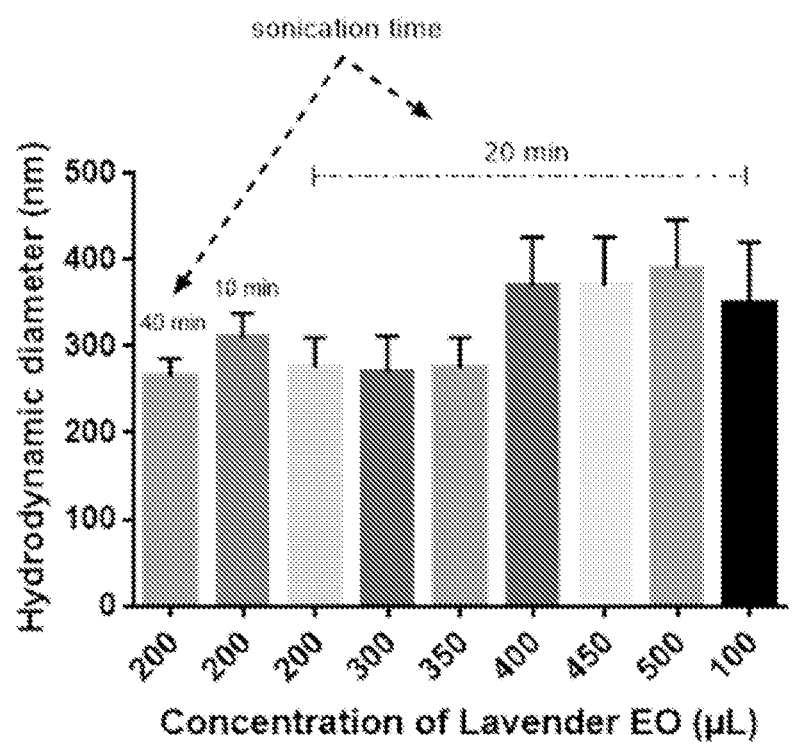
FIG. 7 shows the hydrodynamic diameter of the droplets in different amounts of the tween-80 as surfactant considering the optimized group based on FIG. 3 and FIG. 4.
Figure 8:
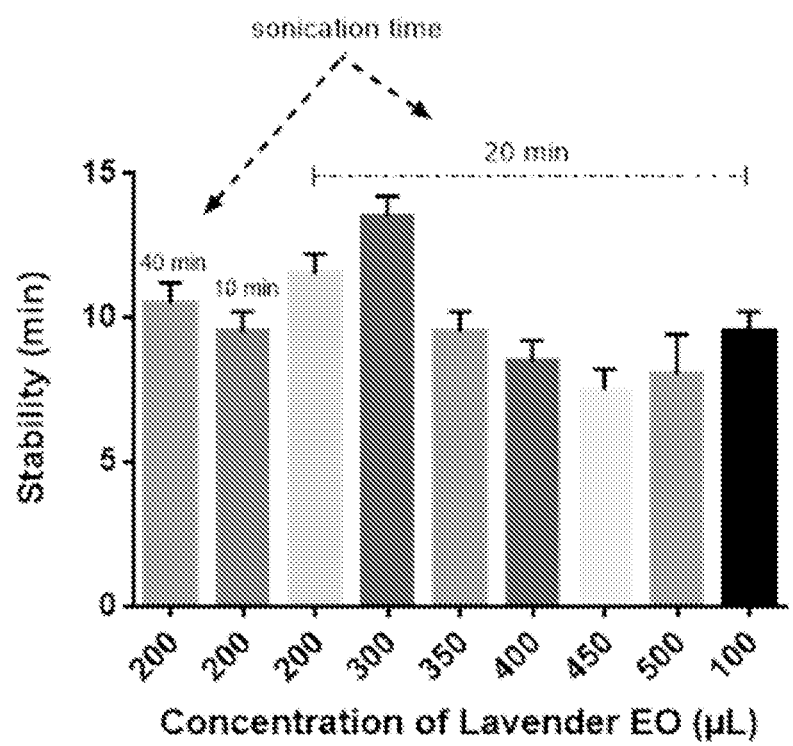
FIG. 8 demonstrates the stability (minutes) diameter of the droplets in different amounts of the tween-80 as surfactant considering the optimized group based on FIG. 3 and FIG. 4.

The final homogenized microemulsion was sonicated using an ultrasonic bath under fixed operation conditions (Power: 170 W, off-set: 2 s, on-set: 8 s, Temp: 25° C.). The prepared nanoemulsion of Lavender essential oil was placed in a cold-water bath (for 20 minutes). The nanoemulsion was then stored in the refrigerator at 4° C. In this invention step, the sonication time was adjusted from 10-40 minutes. The time of sonication plays a vital role in the viewpoint of cost. It has been approved that prolonging the time will affect the droplet size. The final nanoemulsions were different in sonication time and tween-80 content. This step was carried out to study the effect of sonication time and surfactant content on the final stability of lavender essential oil: Viper's-buglosses extract nanoemulsion. The main factor in choosing the optimized sample was the stability of the nanoemulsion based on the results of the centrifuge-based technique. Phase separation determines the stability of the nanoemulsion. The centrifuge-based assay was carried out every one minute at 4000 rpm. After each run, the phase separation was studied. Images (FIG. 6) from the samples were taken for better analysis of Hydrodynamic diameter by Image J software (FIG. 7) and the stability of the final nanoemulsion (FIG. 8).

Example 4: Preparation of the Nanoemulsion 0.5 ml of Lavender essential oil was added dropwise into a beaker containing 10 ml of Viper's-buglosses extract under stirring for 1 h at 300 rpm. The obtained solution was then homogenized by a homogenizer at 2000 rpm for 10 min to produce microemulsion. 0.2 ml of tween-80 was added dropwise into the obtained microemulsion while homogenized at 2000 rpm for 30 minutes. Using a holder, the beaker containing the microemulsion was placed in an ultrasonic bath. The ultrasonic bath parameters were adjusted as: Power: 170 W, off-set: 2 s, on-set: 8 s, Temp: 25° C., Time: 40 min. Measure the mean hydrodynamic diameter of nanodroplets based on the microscopic images. Stability of the prepared nanoemulsion was checked using the centrifuge-based technique. The mean diameter of the Lavender essential oil nanoemulsion nanodroplets was 360-420 nm, see FIG. 4. The created nanoemulsion was stable for 7 min at 4000 rpm (FIG. 5). It means that after 7 runs, phase separation was observed.

The phenomenon of phase separation did not happen ultimately, meaning nanoemulsion was still relatively stable. However, another small phase could be observed. After 7 runs, the diameter size of the nanoemulsion was determined. The mean nanodroplet diameter for the lavender essential oil nanoemulsion was 450-600 nm (FIG. 4). Nanodroplets of the created Lavender essential oil: Viper's-buglosses extract nanoemulsion did not have a small size (less than 100 nm). Optimization of the Lavender essential oil: Viper's-buglosses extract ratio was supposed to decrease the diameter of the nanodroplets.

Example 5: Preparation of the Nanoemulsion of Lavender Essential Oil According to the First Part The lavender essential oil: Viper's-buglosses extract ratio was equal to 0.2:10. 0.2 ml of Lavender essential oil was added dropwise into a beaker containing 10 ml of Viper's-buglosses extract under stirring for 1 h at 300 rpm. The homogenization of the obtained macroemulsion was done using a homogenizer at 2000 rpm for 10 min to produce microemulsion. 0.2 ml of tween-80 was added dropwise into the obtained microemulsion while homogenized at 2000 rpm for 30 minutes. The created microemulsion was placed in the ultrasonic bath using a holder. The ultrasonic bath parameters were adjusted as: Power: 170 W, off-set: 2 s, on-set: 8 s, Temp: 25° C., Time: 40 min.

Figure 3:
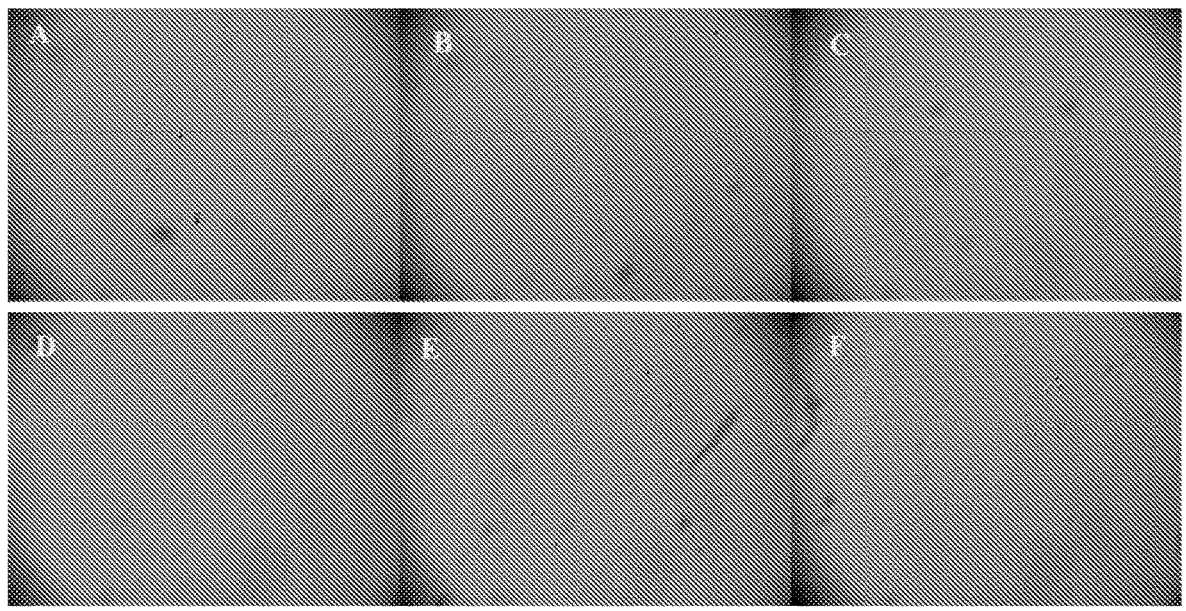
FIG. 3 shows microscopic images of the produced nanoemulsion in different ratios of lavender essential oil: Viper's-buglosses extract as in Table 1, according to an exemplary embodiment of the present invention.

Measure the mean hydrodynamic diameter of nanodroplets based on the microscopic images. Check the stability of the prepared nanoemulsion using the centrifuge-based technique. The mean diameter of the Lavender essential oil nanoemulsion nanodroplets was 250-280 nm, see FIG. 7. Phase separation as the parameter for stability determination occurred after 11 runs (FIG. 3). Altering the Lavender essential oil: Viper's-buglosses extract ratio showed a good result in improving the nanodroplet size and stability. Nanodroplets of the created lavender essential oil nanoemulsion did not have a small size (less than 100 nm). Optimization of the surfactant content (tween-80) was supposed to decrease the diameter of the nanodroplets.

Example 6: Preparation of the Nanoemulsion of Lavender Essential Oil According to the Second Part Add 0.2 ml of Lavender essential oil dropwise into a beaker containing 10 ml of Viper's-buglosses extract under stirring for 1 hour at 300 rpm. Homogenizing the obtained macroemulsion was done using a homogenizer at 2000 rpm for 10 min. Add 0.2 ml of tween-80 dropwise into the obtained microemulsion. Continue homogenization at 2000 rpm for 30 minutes. Put the created microemulsion in the ultrasonic bath using a holder. The ultrasonic bath parameters were adjusted as: Power: 170 W, off-set: 2 s, on-set: 8 s, Temp: 25° C., Time: 10 min. Measure the mean hydrodynamic diameter of nanodroplets based on the microscopic images. Check the stability of the prepared nanoemulsion using the centrifuge-based technique. The mean diameter of the Lavender essential oil nanoemulsion nanodroplets was 290-330 nm, see FIG. 7. Phase separation as the parameter for stability determination occurred after 10 runs. Decreasing the time of sonication did not show a good result in improving the stability.

Figure 9:
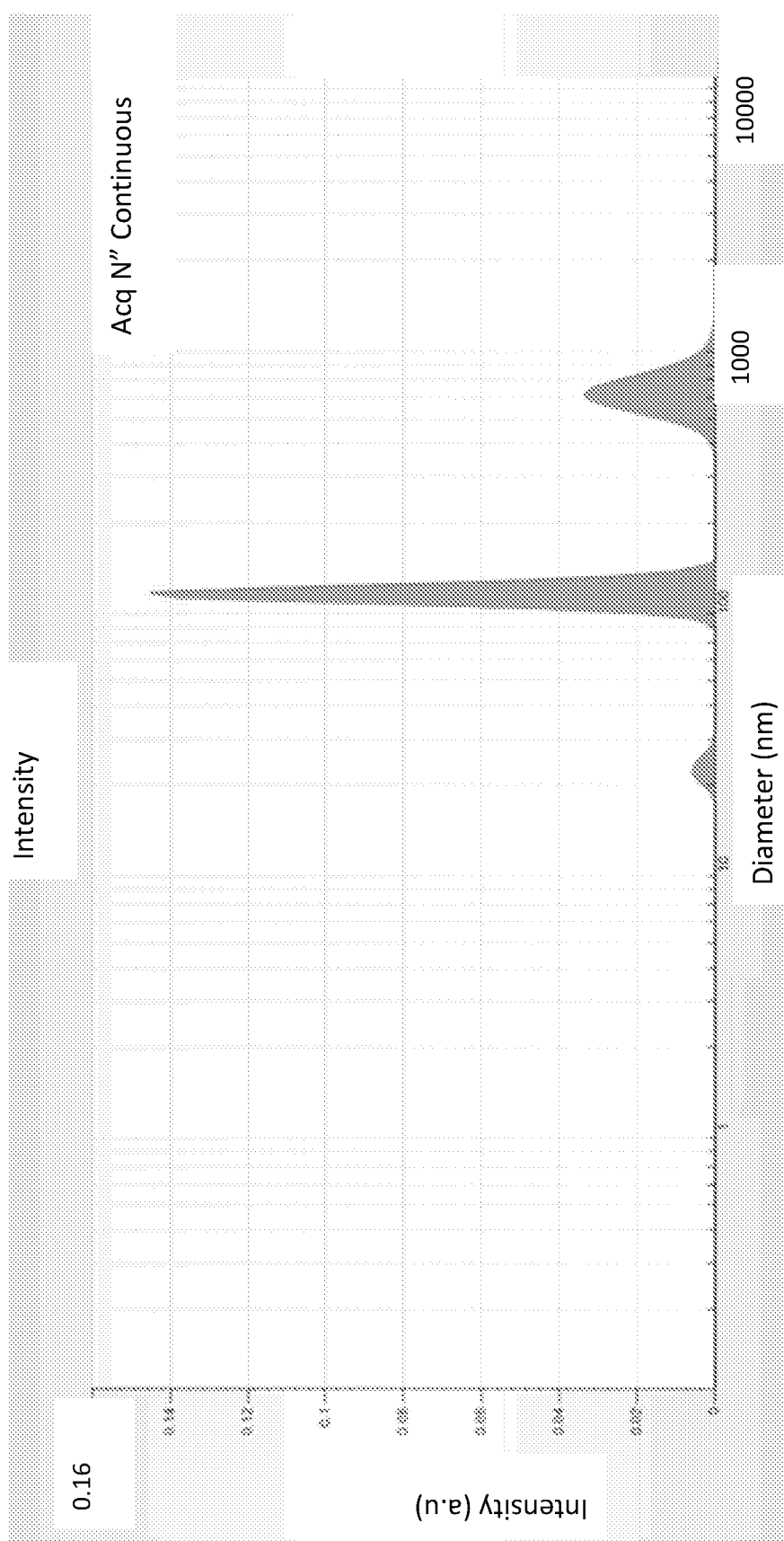
FIG. 9 shows the results of the DLS analysis for the optimized formula based on FIG. 5, FIG. 6, and FIG. 7.

Example 7: Preparation of the Nanoemulsion of Lavender Essential Oil According to the Second Part Add 0.2 ml of Lavender essential oil dropwise into a beaker containing 10 ml of Viper's-buglosses extract under stirring for 1 h at 300 rpm. Homogenizing the obtained macroemulsion was done using a homogenizer at 2000 rpm for 10 min. Add 0.3 ml of tween-80 dropwise into the obtained microemulsion. Continue homogenization at 2000 rpm for 30 minutes. Put the created microemulsion in the ultrasonic bath using a holder. The ultrasonic bath parameters were adjusted as below: Power: 170 W, off-set: 2 s, on-set: 8 s, Temp: 25° C., Time: 20 min. Measure the mean hydrodynamic diameter of nanodroplets based on the microscopic images. Check the stability of the prepared nanoemulsion using the centrifuge-based technique. The mean diameter of the Lavender essential oil nanodroplets in the nanoemulsion was 240-300 nm, see FIG. 7. Phase separation as the parameter for stability determination occurred after 13 runs. Increasing the amount of surfactant showed a good result in improving stability. Altering the time of sonication showed a good result in improving stability. A zeta-sizer checked the improvement of the diameter of the nanodroplets. The nanodroplets of the created Lavender essential oil nanoemulsion showed a diameter of less than 100 nm (FIG. 9). Based on the results (FIG. 9), 3.8% of the nanodroplets had a size of 22.36 nm. 65.45% of the nanodroplets had a size of 22.36 nm. 30.74% of the nanodroplets had a size of 623.99 nm.

Figure 10:
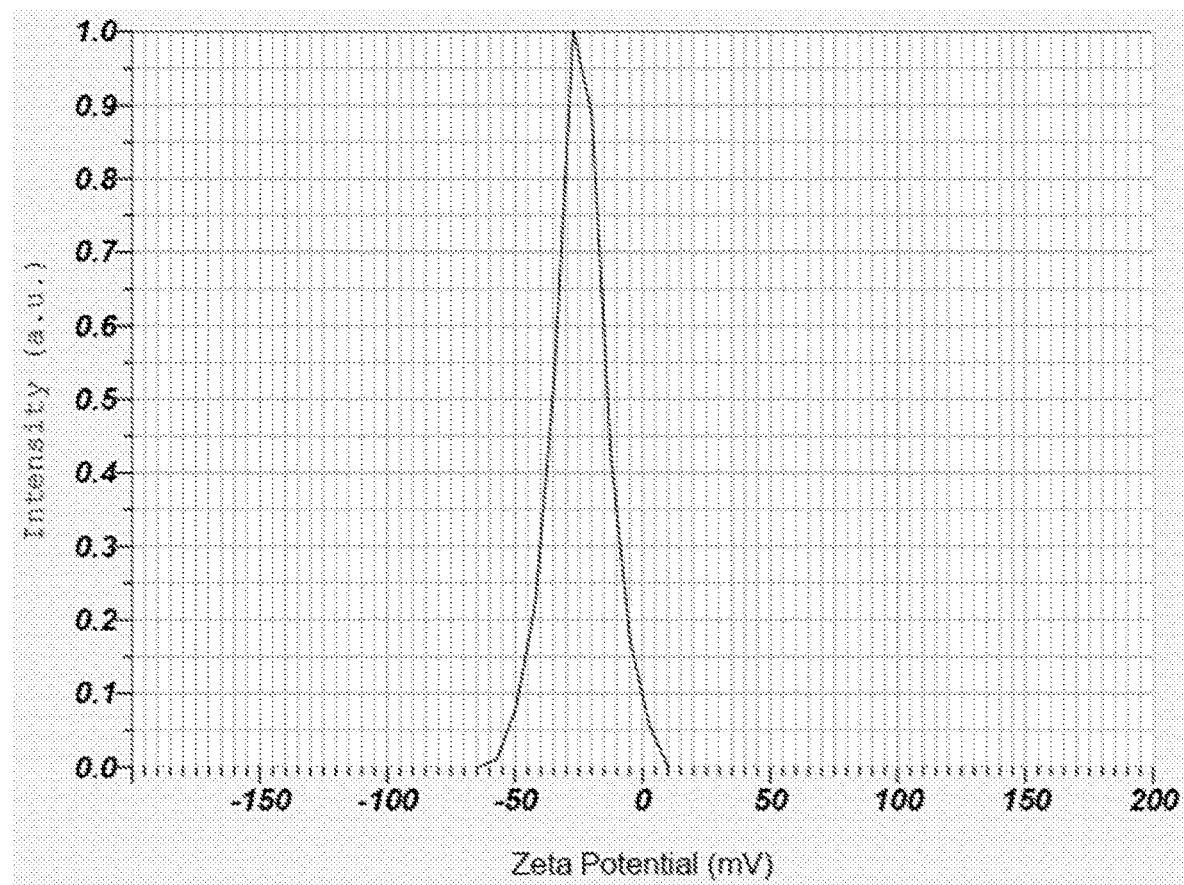
FIG. 10 shows the results of the zeta analysis for the optimized formula based on FIG. 5, FIG. 6, and FIG. 7.
Figure 11:
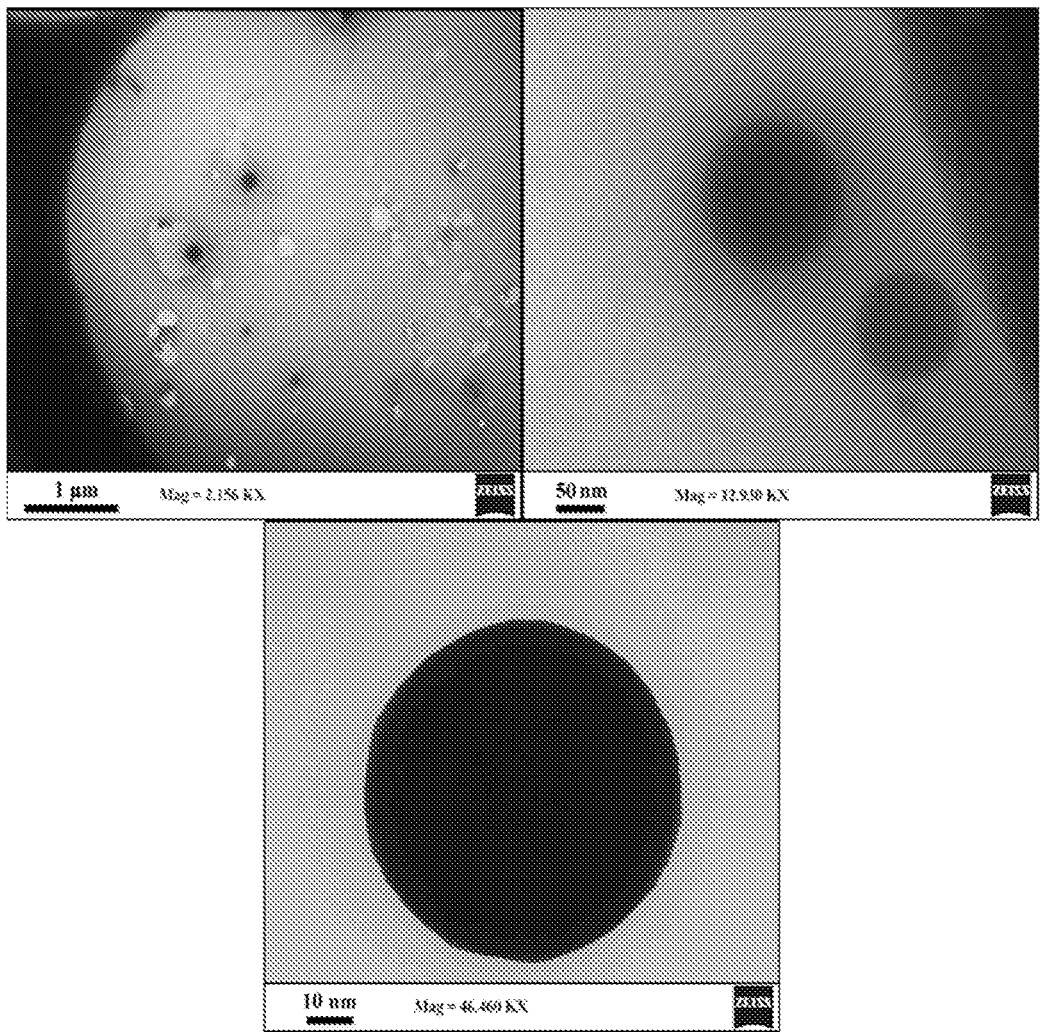
FIG. 11 shows the results of the TEM images for the optimized formula based on the results from FIG. 5, FIG. 6, and FIG. 7.

About 70% of the nanodroplets had a diameter of around 100 nm. Zeta Analysis showed the zeta potential of −24.5 mV for the final nanoemulsion (FIG. 10). Based on the results from TEM analysis, the nanodroplets of the created Lavender essential oil nanoemulsion showed a diameter of less than 100 nm (FIG. 11). The mean diameter of the nanodroplets ranged between 15-85 nm (FIG. 11). Phase separation as the parameter for stability determination occurred after 12 runs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A nanoemulsion consisting essentially of lavender essential oil and an aqueous extract of Viper's buglosses.

2. The nanoemulsion of claim 1, wherein the droplet size of the nanoemulsion ranges from 50-150 nm.

3. The nanoemulsion of claim 1, prepared by a method consisting essentially of:
  dropwise adding Lavender essential oil into Viper's-buglosses aqueous extract while homogenizing a mixture;
  adding an emulsifying agent to the mixture with vigorous homogenization;
  upon adding the emulsifying agent, sonicating the mixture using an ultrasonication bath at room temperature.

4. The nanoemulsion of claim 3, wherein the emulsifying agent is tween-80.

* * * * *